United States Patent
Imaeda (10) Patent No.: US 9,332,115 B2
(45) Date of Patent: May 3, 2016

(54) COMMUNICATION APPARATUS AND METHOD FOR CONTROLLING THE SAME

(71) Applicant: CANON KABUSHIKI KAISHA, Tokyo (JP)

(72) Inventor: Eiji Imaeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/181,243

(22) Filed: Feb. 14, 2014

(65) Prior Publication Data

US 2014/0162720 A1    Jun. 12, 2014

Related U.S. Application Data

(62) Division of application No. 12/812,805, filed as application No. PCT/JP2009/057304 on Apr. 3, 2009, now Pat. No. 8,774,771.

(30) Foreign Application Priority Data

Apr. 7, 2008    (JP) .................. 2008-099807

(51) Int. Cl.
    *H04M 1/725*    (2006.01)
    *H04M 1/663*    (2006.01)

(52) U.S. Cl.
    CPC .......... *H04M 1/72577* (2013.01); *H04M 1/663* (2013.01); *H04M 1/72527* (2013.01); *H04M 1/72597* (2013.01); *H04M 1/7253* (2013.01); *H04M 1/72552* (2013.01)

(58) Field of Classification Search
    CPC .............. H04M 1/663; H04M 1/7253; H04M 1/72577; H04M 1/72527; H04M 1/72552; H04M 1/72597

USPC ............. 455/412.2, 413, 414.1, 550.1, 552.1, 455/556.2

See application file for complete search history.

(56) References Cited

U.S. PATENT DOCUMENTS

| | | | | |
|---|---|---|---|---|
| 5,870,453 A | * | 2/1999 | Shapiro | H04M 1/82 379/102.03 |
| 6,421,544 B1 | * | 7/2002 | Sawada | H04M 1/663 455/418 |

(Continued)

FOREIGN PATENT DOCUMENTS

| | | |
|---|---|---|
| JP | 2001-078078 A | 3/2001 |
| JP | 2001285952 A | 10/2001 |

(Continued)

OTHER PUBLICATIONS

U.S. Appl. No. 12/666,285; 371(c) date: Dec. 22, 2009, by Eiji Imaeda.

*Primary Examiner* — Khai M Nguyen (74) *Attorney, Agent, or Firm* — Fitzpatrick, Cella, Harper & Scinto (57) ABSTRACT

An operator is prevented from accidently operating a communication apparatus during short range communication, even if there is an incoming call/mail. A communication apparatus has at least a first communication unit that performs wireless communication for a call or a mail, and a second communication unit that is different from the first communication unit. The communication apparatus changes a notification function that notifies a user of an incoming call/mail received by the first communication unit to a prohibited status in accordance with a start of communication by the second communication unit, and cancels the prohibited status of the notification function in accordance with an end of communication by the second communication unit.

23 Claims, 6 Drawing Sheets

(56) References Cited

U.S. PATENT DOCUMENTS

| | | | |
|---|---|---|---|
| 7,280,833 B2* | 10/2007 | Suda | H04W 88/06 455/414.1 |
| 7,328,002 B2* | 2/2008 | Goto | G06Q 20/04 379/265.02 |
| 2002/0111153 A1 | 8/2002 | Hartmaier et al. | |
| 2003/0013484 A1* | 1/2003 | Nishimura et al. | 455/556 |
| 2004/0254715 A1* | 12/2004 | Yamada | 701/117 |
| 2005/0032502 A1* | 2/2005 | Tokudome | 455/403 |
| 2005/0170828 A1* | 8/2005 | Nakamura et al. | 455/419 |
| 2006/0079282 A1 | 4/2006 | Niimi | |
| 2006/0136610 A1 | 6/2006 | Lee et al. | |
| 2007/0010287 A1 | 1/2007 | Hara et al. | |
| 2009/0252140 A1 | 10/2009 | Imaeda | |

FOREIGN PATENT DOCUMENTS

| | | |
|---|---|---|
| JP | 2004-048251 A | 2/2004 |
| JP | 2004-242274 A | 8/2004 |
| JP | 2005-057525 A | 3/2005 |
| JP | 2005-191790 A | 7/2005 |
| JP | 2005-328321 A | 11/2005 |
| JP | 2007-006173 A | 1/2007 |

\* cited by examiner

COMMUNICATION APPARATUS AND METHOD FOR CONTROLLING THE SAME

This application is a divisional of U.S. patent application Ser. No. 12/812,805, which was the National Stage of International Application No. PCT/JP2009/057304, filed Apr. 3, 2009. The contents of each of the foregoing applications are incorporated by reference herein.

TECHNICAL FIELD

The present invention relates to a communication apparatus, such as a mobile phone, that has a plurality of communication functions, and a method for controlling the same. More specifically, the invention relates to a processing method performed in a case in which there is an incoming call or mail or the like during communication.

BACKGROUND ART

In recent years, a mobile phone has included a function that performs data communication using a function for second communication, which is different from communication with a mobile phone, in addition to a call function and a mail function. Examples of the second communication function include a wire communication function such as RS232 or USB, and a short range communication function such as RFID, FeliCa, or NFC (near field communication). Moreover, in recent years, due to the realization of high-speed technology in short range communication, it has become possible for a large amount of data to be transferred between a mobile phone and a personal computer (hereinafter, referred to as PC) and the like.

Japanese Patent Laid-Open No. 2004-242274 proposes a method in which either a mobile phone function or a second communication function can be activated, or both of the functions can be activated in this type of a mobile phone by using a switching signal. This method enables addressing a problem that occurs when the mobile phone function and the second communication function are used at the same time.

In a general method, when there is a desire to use the mobile phone function and a short range communication function as the second communication function at the same time, it has been necessary to set both functions so as to be operable at all times. In this case, however, if there is an incoming call/mail to the mobile phone during short range communication, an operator may accidently operate the mobile phone, thus resulting in a failure in the short range communication, which is a problem. That is, during short range communication with a mobile phone having a short range communication function, a failure occurs in the short range communication if the operator accidently operates the mobile phone because of an incoming call/mail to the mobile phone or the like, which is a problem.

DISCLOSURE OF INVENTION

The present invention was achieved in view of the above problems. The present invention provides a communication apparatus and method which prevents an operator from accidently operating the communication apparatus during short range communication, even if there is an incoming call or mail or the like.

According to one aspect of the present invention, there is provided a communication apparatus comprising: a first communication means for performing wireless communication for at least a call or a mail; a second communication means that is different from the first communication means; and a prohibition means for changing a notification function that notifies a user of an incoming call/mail received by the first communication means to a prohibited status in accordance with a start of communication by the second communication means.

Also, another aspect of the present invention, there is provided a method for controlling a communication apparatus that includes at least a first communication means for performing wireless communication for a call or a mail and a second communication means that is different from the first communication means, the method comprising a prohibition step of prohibiting to notify a user of an incoming call/mail received by the first communication means in accordance with a start of communication by the second communication means.

Further features of the present invention will become apparent from the following description of exemplary embodiments with reference to the attached drawings.

BEST MODE FOR CARRYING OUT THE INVENTION

Hereinafter, preferred embodiments of the present invention will be described with reference to the attached drawings.

First Embodiment

Figure 1:
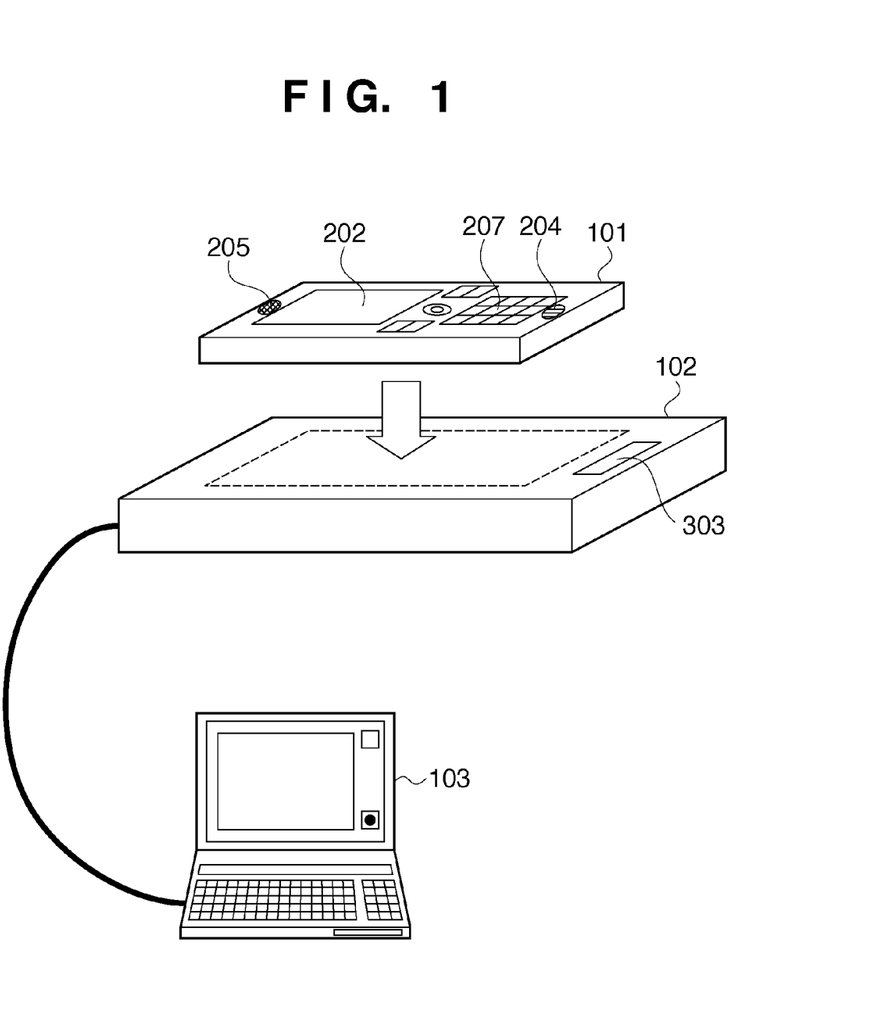
FIG. 1 is a diagram showing an example of an overall configuration of a short range communication system according to a first embodiment.

FIG. 1 shows an example of an overall configuration of a short range communication system according to the first embodiment. In FIG. 1, reference numeral 101 designates a mobile phone, reference numeral 102 designates a reading unit for short range communication, and reference numeral 103 designates a PC.

The mobile phone 101 performs a mobile phone call function and a mail sending/receiving function, by connecting to a mobile phone base station (not shown). In addition, the mobile phone 101 has a short range communication function, and by placing the mobile phone 101 in a prescribed position on the reading unit 102, data can be mutually and wirelessly transferred between the mobile phone 101 and the PC 103 connected thereto via the reading unit 102.

Figure 2:
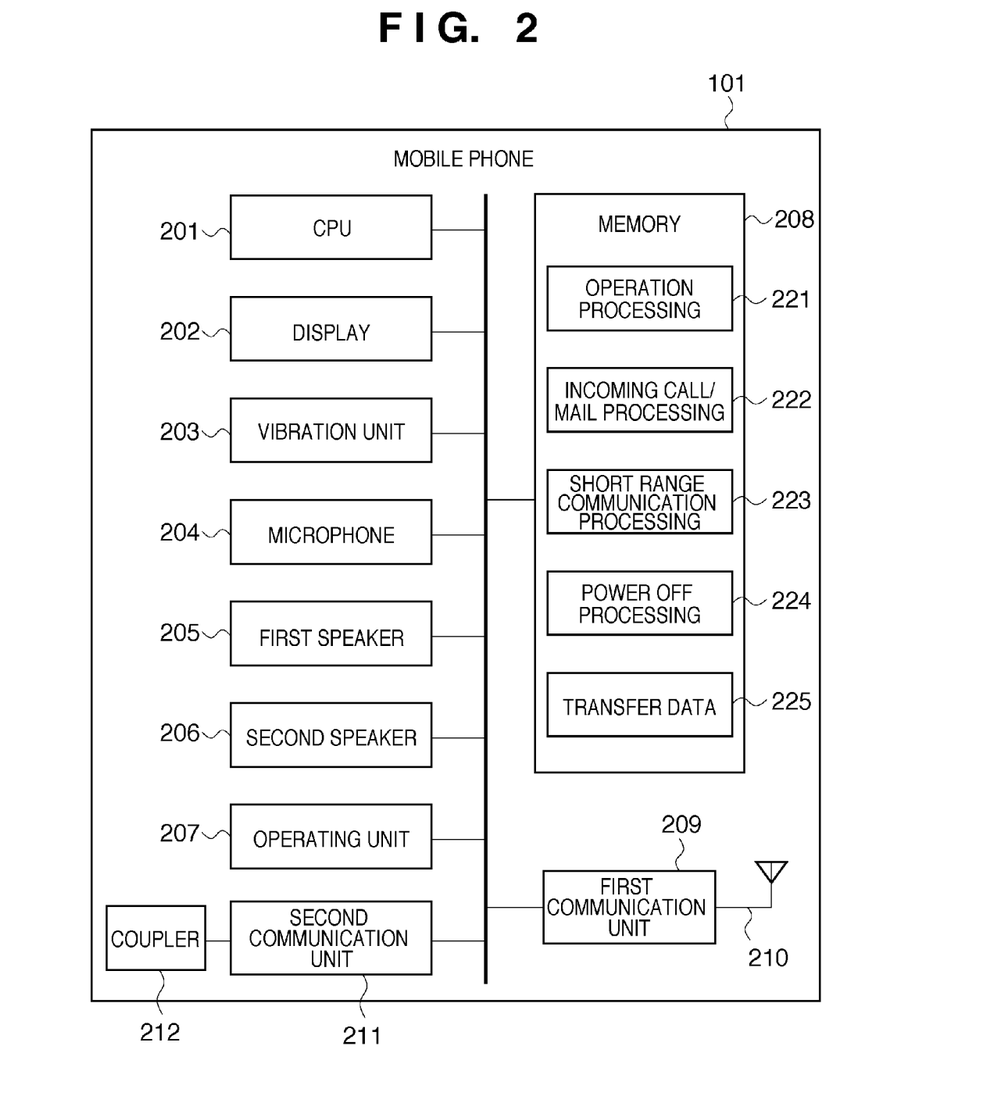
FIG. 2 is a block diagram showing an example of an internal configuration of a mobile phone according to the first embodiment.

FIG. 2 is a block diagram showing an example of an internal configuration of the mobile phone 101 according to the first embodiment. In FIG. 2, reference numeral 201 designates a CPU that controls entire operation of the mobile phone, reference numeral 202 designates a display, reference numeral 203 designates a vibration unit, reference numeral 204 designates a microphone for calls, reference numeral 205 designates a first speaker for calls, reference numeral 206 designates a second speaker for incoming call/mail alert sound, and reference numeral 207 designates an operating unit composed of a plurality of keys. Further, reference numeral 208 designates a memory that stores various operating programs for controlling operations of the CPU 201, reference numeral 209 designates a first communication unit that processes a mobile phone communication function, and reference numeral 210 designates a mobile phone antenna. Also, reference numeral 211 designates a second communication unit that processes a communication function for short range communication, and reference numeral 212 designates a coupler for short range communication.

A description of detailed operations in the mobile phone function that uses the first communication unit 209 is omitted herein due to being known technology, and not being essential matter of the present invention. When the mobile phone 101 receives an incoming call or an incoming mail from the base station, a message showing that there is an incoming call/mail is displayed on the display 202 so as to notify an operator. Moreover, when receiving an incoming call or an incoming mail, the mobile phone 101 notifies the operator that there is an incoming call/mail, by causing the vibration unit 203 to vibrate. Upon noticing that there is an incoming call/mail, the operator answers the incoming call or displays and reads the received mail by operating the operating unit 207.

The second communication unit 211 is a communication unit that realizes a function for communication called short range communication. By bringing the coupler 212 close to a coupler of another device with which the coupler 212 intends to communicate, an induced electric field acts between the couplers, so that the second communication unit 211 realizes wireless communication. The power applied in the coupler 212 is extremely weak, and communication is performed at an electric field intensity that is less than or equal to 35 µV/m, which is a specification for an extremely low power radio station, and therefore a license is not necessary. In the present embodiment, when couplers are brought close to each other within zero to a few centimeters, communication can be performed. However, when the couplers are separated farther than that communication range, communication cannot be performed, resulting in communication failure. Communication between couplers is performed in a range that is much narrower (shorter) than that of communication with the base station, and is a function for performing communication in a narrower communication range than that of the first communication unit 209.

Figure 3:
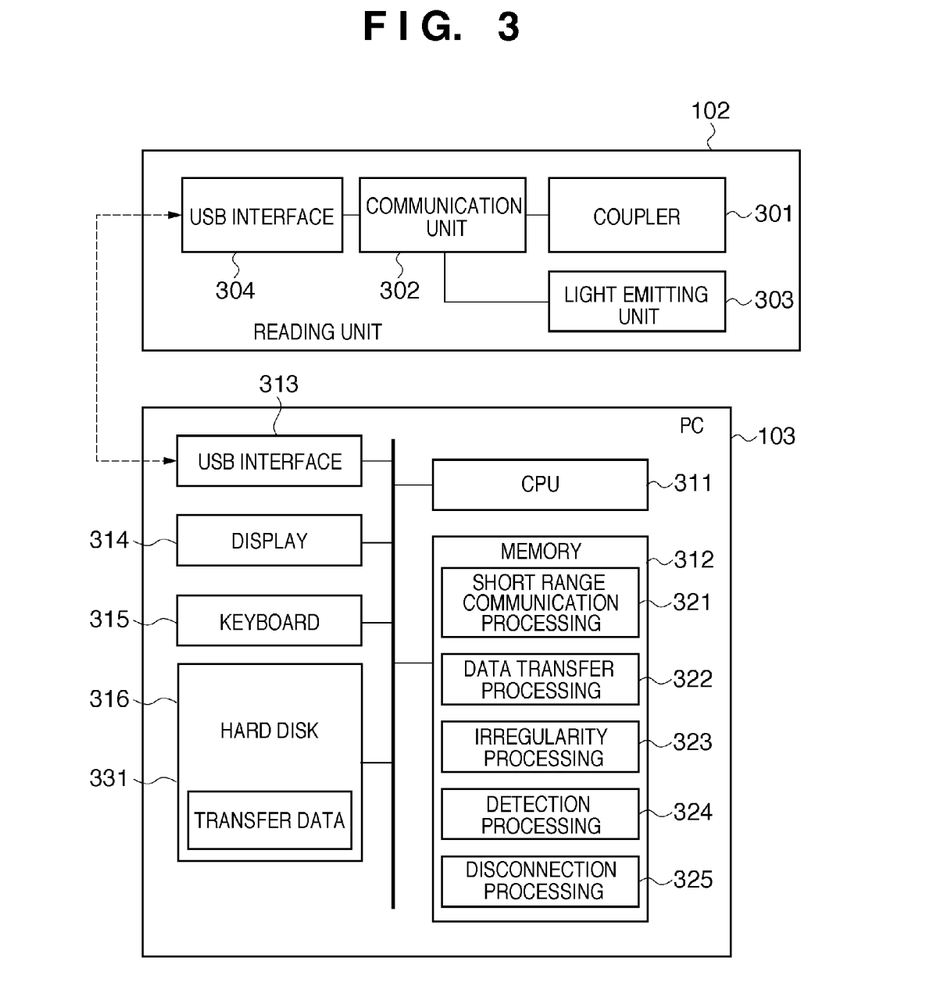
FIG. 3 is a block diagram showing an example of an internal configuration of a reading unit and a PC according to the first embodiment.

FIG. 3 is a block diagram showing an example of an internal configuration of the reading unit 102 and the PC 103.

Reference numeral 301 designates a coupler for short range communication, reference numeral 302 designates a communication unit that processes a communication function for short range communication, reference numeral 303 designates a light emitting unit, and reference numeral 304 designates a USB interface.

The coupler 301 is connected to the communication unit 302, and realizes short range communication by being brought close to the coupler 212. The light emitting unit 303 is a light emitting unit that lights up during short range communication so as to visually notify the operator that communication is being performed.

Reference numeral 311 designates a CPU that controls operation of the PC 103, reference numeral 312 designates a memory that stores an operating program, reference numeral 313 designates a USB interface, reference numeral 314 designates a display, reference numeral 315 designates a keyboard, and reference numeral 316 designates a hard disk.

The CPU 311 controls the communication unit 302 via the USB interfaces 313 and 304, and controls short range communication between the mobile phone 101 and the reading unit 102 via the coupler 301.

In the PC 103, a short range communication processing program 321 stored in the memory 312 is waiting to operate at all times. Thus, when the mobile phone 101 is placed in a position on the reading unit 102 where short range communication can be performed, a connection notification command is notified from the reading unit 102 to the PC 103 via the USB interfaces 304 and 313, and short range communication processing begins. An example of the short range communication will be described later.

Figure 4:
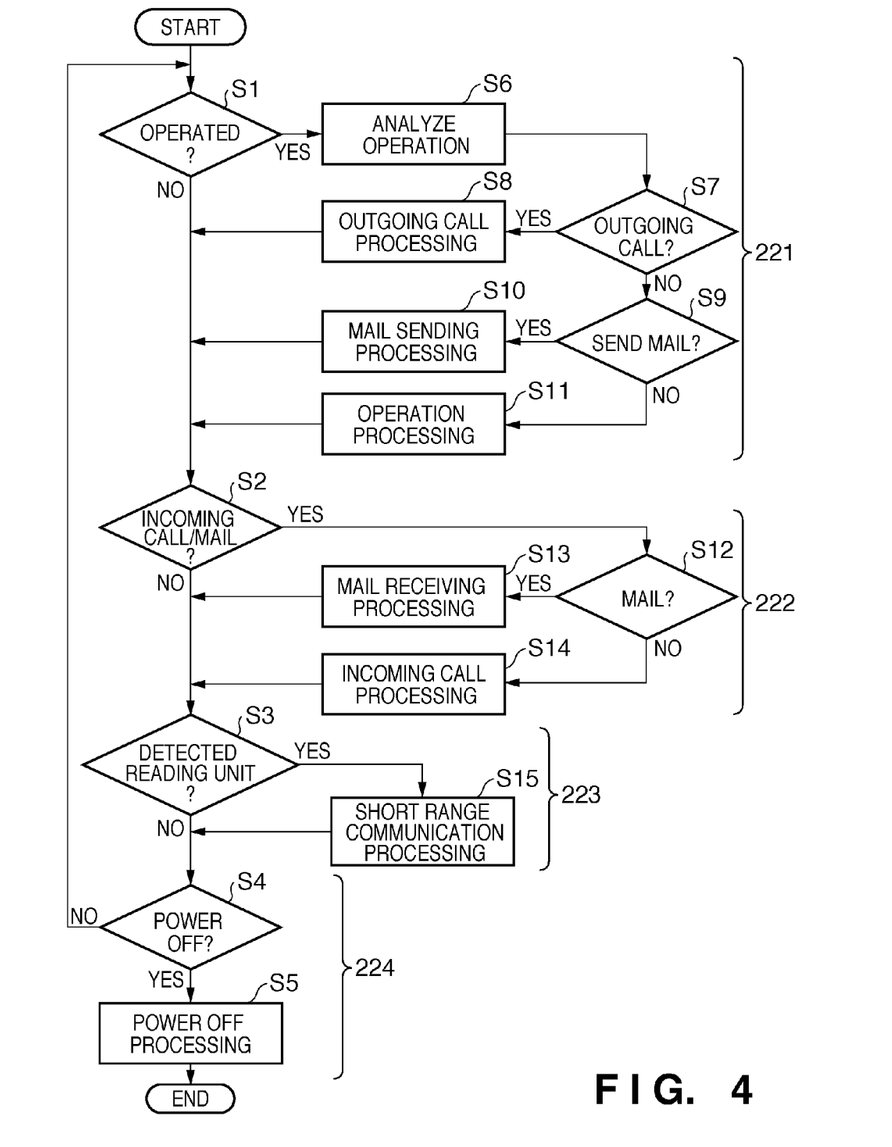
FIG. 4 is a flow chart illustrating processing performed by the mobile phone according to the first embodiment.

FIG. 4 is a flow chart showing processing performed by the mobile phone 101 according to the first embodiment.

After starting up due to a power-on operation, the mobile phone 101 repeats processing so as to be waiting to perform operation judgment processing (step S1), incoming call/mail judgment processing (step S2), reading unit detection judgment processing (step S3), and power-off processing (step S4) (standby processing loop).

By performing operation processing 221 in the memory 208, the CPU 201 of the mobile phone 101 realizes operation processing described below. When performing the operation judgment (step S1), the CPU 201 judges whether there is an input of an operation from a user. When the CPU 201 judges that there is an input of an operation because some kind of input processing has been performed, the CPU 201 analyzes the content of the operation (step S6). Then, if the CPU 201 judges that the operation is an outgoing call operation (step S7), outgoing call processing (step S8) is performed in accordance with a designated telephone number, and processing returns to the standby processing loop. On the other hand, if the operation is not outgoing call processing, the CPU 201 subsequently judges whether the input of an operation is a mail sending operation (step S9). Then, if the operation is judged to be a mail sending operation, mail sending processing (step S10) is performed so as to send a mail containing designated content to a designated address, and processing returns to the standby processing loop. Further, if the operation is not a mail sending operation either, the CPU 201 performs operation processing (step S11) in accordance with the operation, and processing returns to the standby processing loop.

By performing incoming call/mail processing 222 in the memory 208, the CPU 201 of the mobile phone 101 realizes incoming call/mail processing described below. First, when performing the incoming call/mail judgment (step S2), the CPU 201 judges whether there is an incoming call/mail from a mobile phone network. If there is an incoming call/mail, the CPU 201 judges whether the incoming call/mail is a mail to be received (step S12). Then, if it is judged to be a mail to be received, the CPU 201 performs mail receiving processing (step S13) using the first communication unit 209. If the incoming call/mail is not a mail to be received, the CPU 201 judges it to be an ordinary incoming call and performs incoming call processing (step S14) using the first communication unit 209, in accordance with an operation of the operator.

By performing short range communication processing 223 in the memory 208, the CPU 201 of the mobile phone 101 realizes short range communication processing described below. The CPU 201 detects a partner device with which short range communication is to be performed in the reading unit detection processing (step S3). When the mobile phone 101 is placed on the reading unit 102, the CPU 201 judges that the short range communication partner device has been detected. If the reading unit 102 is detected in the reading unit detection processing (step S3), the CPU 201 performs short range communication processing (step S15) using the second communication unit 211. In the present embodiment, communication is performed with the PC 103 via the reading unit 102, which is the short range communication partner device. In the PC 103, detection processing 324 detects the short range communication partner device based on a signal from the reading unit 102 (coupler 301), and thereafter, short range communication processing 321 begins short range communication. When the short range communication processing 223 ends, processing returns to the standby processing loop. The short range communication processing 223 will be described in further detail later.

By performing power-off processing 224 in the memory 208, the CPU 201 of the mobile phone 101 realizes power-off processing described below. When performing the power-off judgment (step S4), the CPU 201 judges whether the operator has performed an operation to turn off the power of the mobile phone 101 using the operating unit 207. If the operator performed the power-off operation, the CPU 201 performs power-off processing (step S5) and thereafter ends this processing. In the PC 103, in accordance with the end of data transfer by data transfer processing 322 or detection of irregularity by irregularity processing 323, disconnection processing 325 starts up, and the short range communication is disconnected.

Figure 5A:
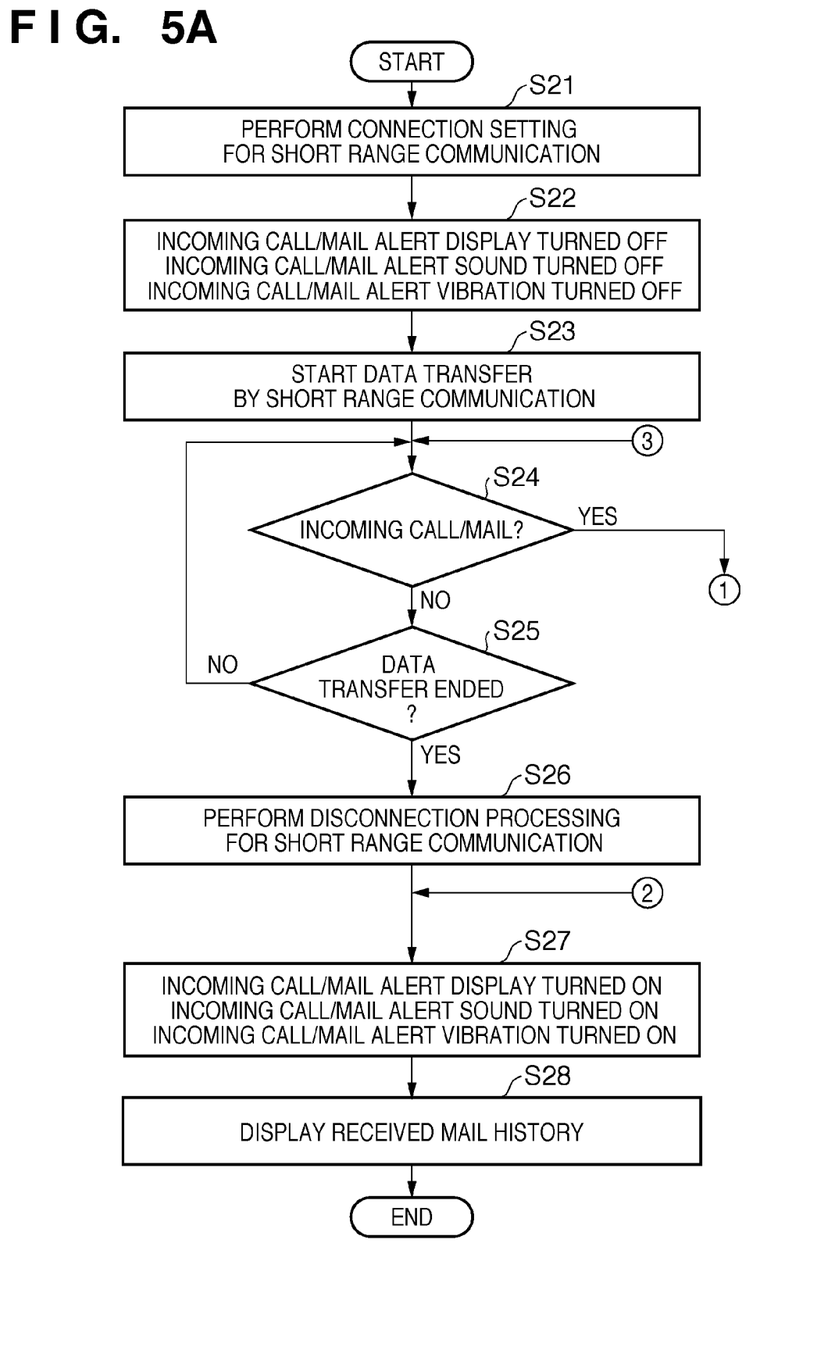
FIGS. 5A and 5B are flow charts showing short range communication processing performed by the mobile phone according to the first embodiment.
Figure 5B:
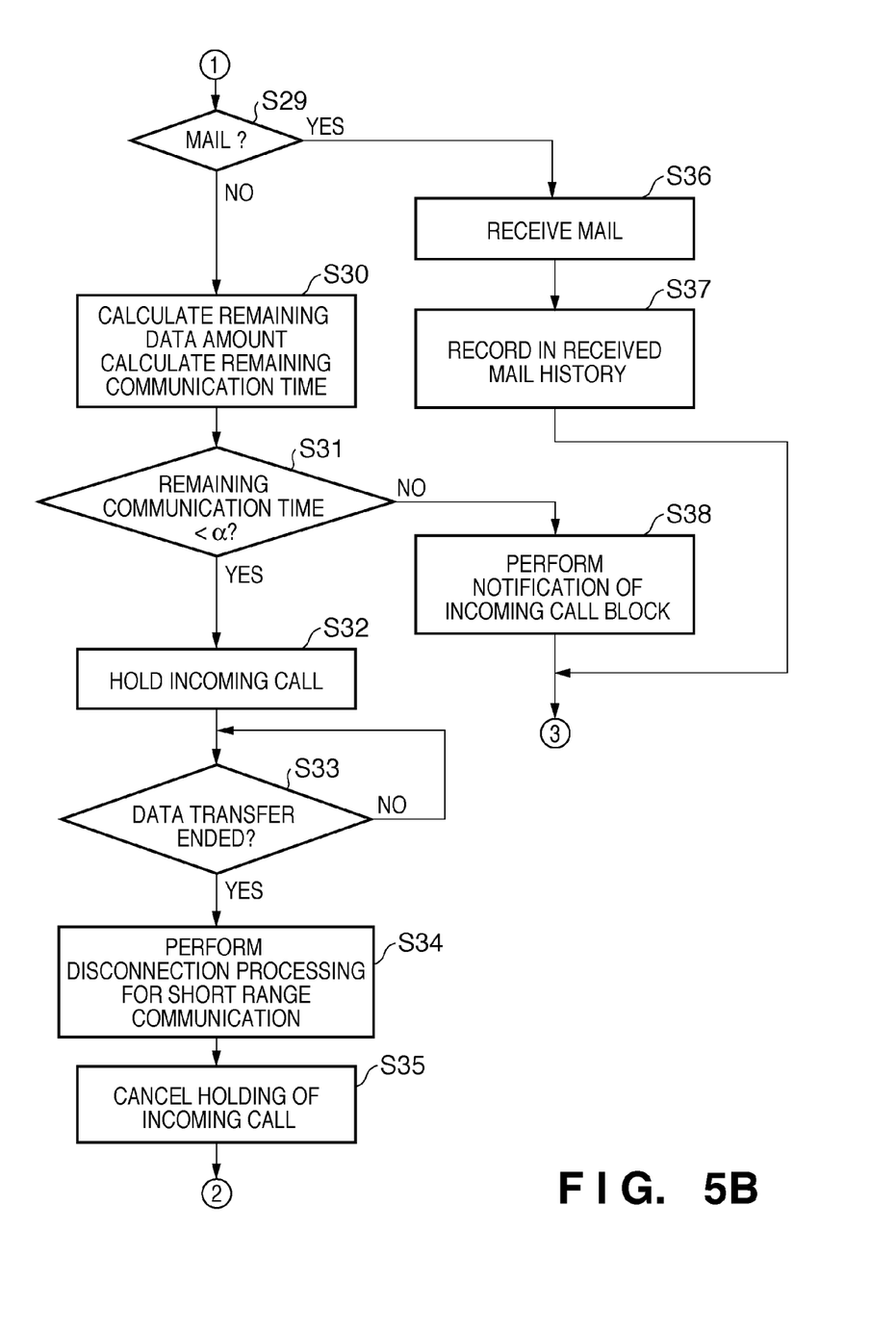

FIGS. 5A and 5B are flow charts showing detailed processing of the short range communication processing (step S15) shown in FIG. 4.

First, in the short range communication processing, the CPU 201 performs connection setting processing (step S21) for establishing a communication channel for short range communication between the second communication unit 211 of the mobile phone 101 and the communication unit 302 of the reading unit 102. When the connection setting processing (step S21) is completed, the CPU 201 sets incoming call/mail alert display on the display 202, incoming call/mail alert sound from the second speaker 206 and incoming call/mail alert vibration of the vibration unit 203 of the mobile phone 101 to OFF (step S22). That is, in accordance with the start of communication by the second communication unit 211, notification functions (for example, incoming call/mail alert display, incoming call/mail alert sound, and incoming call/mail alert vibration) used for notifying the user that there is an incoming call/mail received by the first communication unit 209 are changed to a prohibited status. Accordingly, even if there is an incoming call/mail, the mobile phone 101 will not notify the operator that there is an incoming call or an incoming mail. Subsequently, the CPU 201 starts data transfer by short range communication (step S23). In the PC 103, under the control of short range communication processing 321, the data transfer processing 322 is performed and thus, data transfer between the mobile phone 101 and the PC 103 is performed.

Note that in the data transfer start processing (step S23), information indicating the amount of data to be transferred is obtained from information appended to the head of the data. When performing data transfer from the mobile phone 101 to the PC 103, transfer data 225 is read from the memory 208 and sent from the second communication unit 211. Note that, when performing data transfer from the PC 103 to the mobile phone 101, the CPU 201 stores data received by the second communication unit 211 in free space in the memory 208.

During data communication by short range communication, the CPU 201 repeats incoming call/mail judgment (step S24) and data transfer end judgment (step S25). Note that, during data transfer, the light emitting unit 303 of the reading unit 102 lights up so as to notify the operator that communication is being performed.

When data transfer by short range communication ends (steps S24 and S25) without receiving a call or mail, the CPU 201 performs short range communication disconnection processing (step S26), and the short range communication between the mobile phone 101 and the PC 103 ends. Then, the CPU 201 sets the incoming call/mail alert display on the display 202, the incoming call/mail alert sound from the second speaker 206 and the incoming call/mail alert vibration of the vibration unit 203 of the mobile phone 101 to ON (step S27). That is, in accordance with the end of communication by the second communication unit 211, the prohibited status of the notification functions for notifying an incoming call and an incoming mail is cancelled.

Next, the CPU 201 checks whether there is a history of a mail received during data transfer processing by the short range communication (from after step S22 is performed until before step S27 is performed). Then, if there is a received mail in the history, the CPU 201 notifies the operator by displaying a message showing that there is a received mail on the display 202 (step S28).

Note that a mobile phone generally has a function, such as a manner mode, for example, for switching ON and OFF the performance of incoming call/mail alert display, incoming call/mail alert sound, and incoming call/mail alert vibration. Accordingly, in step S22, among incoming call/mail alert display, incoming call/mail alert sound, and incoming call/mail alert vibration, any notification function that is in an ON status is turned OFF. Also, any notification function that was turned OFF in step S22 may be turned ON in step S27.

Next, the case in which there is an incoming call/mail during data transfer by short range communication will be described. When it is judged that there is an incoming call/mail in the incoming call/mail judgment processing (step S24), the CPU 201 judges whether the incoming call/mail is an incoming mail (step S29). When the CPU 201 judges it to be an incoming mail, the CPU 201 performs mail receiving processing (step S36). Then, the CPU 201 records the received mail in a history (step S37), and processing returns to a data transfer processing loop (steps S24 and S25).

In step S29, if the incoming call/mail is not a mail, it is judged to be an incoming call. When it is judged to be an incoming call, the CPU 201 calculates a remaining data amount of the short range communication that is being performed, and calculates a remaining communication time for completing the data transfer from the remaining data amount and communication rate (step S30).

Then, the CPU 201 judges whether the remaining communication time is shorter than a predetermined value α (step S31). If the remaining communication time is longer than or equal to the value α, a notification of incoming call block (reject) is sent as a reply to an incoming call to the mobile phone (step S38).

On the other hand, if the remaining communication time is shorter than the predetermined value α, the CPU 201 holds an incoming call to the mobile phone (step S32). This processing is to hold the incoming call, and the incoming call is seemingly not answered at all. That is, the other party of communication (caller) thinks that the mobile phone just keeps ringing. Note that the other party of communication may be notified that the call is put on hold in the same way as a case of using what is known as a "hold button" for holding the line. Then, the CPU 201 waits until the data transfer ends (step S33), and performs disconnection processing of the short range communication (step S34) when the data transfer ends.

Subsequently, the CPU 201 cancels the holding of the incoming call performed in step S32 (step S35). Further, incoming call/mail alert display, incoming call/mail alert sound, and incoming call/mail alert vibration are turned ON (step S27).

Specific cases of controlling an incoming call/mail to the mobile phone 101 described above will be further described.

<Case 1>

The following describes a case in which there is an incoming mail while the transfer data 225 is transferred from the mobile phone 101 to the PC 103.

In this case, in the short range communication processing (step S15) of the mobile phone 101, processing goes through steps S21, S22, S23, S24, S29, S36, and S37, and returns to step S24. Then, after the data transfer by short range wireless communication ends, processing goes through steps S25, S26, S27, and S28, and thereafter this processing ends. That is, during data transfer by short range communication from the mobile phone 101 to the PC 103, if there is an incoming mail to the mobile phone 101, the mail is received without notifying the operator of anything. Then, the operator is notified that there is a received mail after the data transfer ends.

Therefore, the operator in this case does not notice that there is an incoming mail during short range communication. This enables preventing a failure in short range communication caused by the operator accidently trying to operate the mobile phone during the communication. That is, it is possible to prevent the mobile phone and the reading unit from becoming separated out of the communication range due to the mobile phone being unintentionally picked up.

<Case 2>

The following describes a case in which there is an incoming call during data transfer of transfer data 331 by short range wireless communication from the PC 103 to the mobile phone 101, and the amount of the transfer data 331 is small and the value α is three seconds.

In this case, in the short range communication processing (step S15) of the mobile phone 101, processing goes through steps S21, S22, S23, S24, S29, and S30. Also, the remaining communication time calculated in step S31 is two seconds. In this case, since the remaining communication time two seconds) is shorter than the value α (=three seconds), processing proceeds from step S31 to step S32. Subsequently, processing goes through steps S33, S34, S35, S27, and S28. Then, the short range communication processing ends, and processing returns to the original standby processing loop (steps S1 to S4). That is, the mobile phone 101 continues data transfer by short range communication while holding the incoming call. Then, after the data transfer ends, the mobile phone 101 performs incoming call alert display, incoming call alert sound, and incoming call alert vibration in accordance with the held incoming call, and prompts the operator to perform an answering operation.

That is, in this case, even if there is an incoming call to the mobile phone during short range communication, notification of an incoming call is not performed. After data transfer by the short range communication ends, incoming call alert display is displayed, incoming call alert sound is caused to ring, and incoming call alert vibration is caused to vibrate. Thus, it is possible to prevent a situation in which a failure in short range communication occurs due to the operator accidently trying to operate the mobile phone during data transfer by short range communication.

<Case 3>

The following describes a case in which there is an incoming call during data transfer of the transfer data 225 from the mobile phone 101 to the PC 103, and the amount of the transfer data 225 is large and the value α is three seconds.

In this case, in the short range communication processing (step S15) of the mobile phone 101, processing goes through steps S21, S22, S23, S24, S29, and S30. Also, the remaining communication time calculated in step S31 is ten seconds. In this case, since the remaining time (=ten seconds) is longer than the value α (=three seconds), processing proceeds from step S31 to step S38, and the CPU 201 notifies the caller of incoming call block. Then, the CPU 201 returns the processing to step S24, and continues data communication. When the data communication ends (step S25), processing proceeds to steps S26, S27, and S28, and returns to the usual standby processing loop (steps S1 to S4).

That is, even if there is an incoming call to the mobile phone during the short range communication, the incoming call is blocked in this case. Thus, it is possible to prevent a situation in which a failure in short range communication occurs due to the operator accidently trying to operate the mobile phone during data transfer by short range communication.

Note that, when blocking an incoming voice communication, the incoming call is not recorded in a history in the above processing. However, such a blocked incoming call may be kept in the history, and a blocked incoming call history may be displayed with a received mail history in step S28. That is, a history of an incoming call/mail received by the first communication unit 209 (a received mail history and/or a blocked incoming call history) that is recorded during communication by the second communication unit 211 may be displayed after the communication ends by the second communication unit 211.

Second Embodiment

Although the first embodiment was described with an example of communication using a coupler that utilizes an induced electric field when a communication unit performs short range communication, short range communication may be performed using a loop antenna suited to a wavelength of a communication carrier wave. In this case, it is sufficient to replace the coupler 212 of the mobile phone 101 (shown in FIG. 2) and the coupler 301 of the reading unit 102 (shown in FIG. 3) with loop antennas.

Further, as a specific example of the short range wireless communication, not only a method using an induced electric field, but also a method using electromagnetic induction may be employed. Of course, a method using RFID or FeliCa may also be employed. Moreover, in addition to a method using a radio wave, a method using optical communication such as IrDA may also be employed.

Also, in the first embodiment, the incoming call block processing is performed as a reply in step S38. However, telephone answering may be performed to the other party who is calling, and the mobile phone 101 may not display anything until data communication ends. In this case, a telephone answering history may also be displayed in addition to a received mail history in step S28. Further, in the first embodiment, processing is switched so that an incoming call is blocked or held in accordance with the remaining communication time. However, irrespective of the remaining communication time, if any incoming call/mail is judged to be an incoming call as a result of judgment in step S29 in FIG. 5B, all the incoming calls may be either blocked or held.

Also, although the aforementioned embodiments are described using what is known as a mobile phone, the embodiments are not limited to this. That is, it will be clear that the present invention is applicable to any communication apparatus that includes at least a first communication unit that performs wireless communication for a call and a mail, and a second communication unit having a short range communication function.

According to the present invention, even if there is an incoming call or an incoming mail to a communication apparatus during short range communication, the operator will not be notified of the incoming call/mail until the short range communication ends. Therefore, the present invention enables preventing the operator from accidently operating the communication apparatus during short range communication and thus, preventing a failure in short range communication.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2008-099807, filed Apr. 7, 2008, which is hereby incorporated by reference herein in its entirety.

The invention claimed is:

1. A communication apparatus comprising:
a first transmission unit configured to perform a first transmission processing for wirelessly transmitting at least a call;
a second transmission unit configured to perform a second transmission processing for executing a wireless transmission from an external apparatus to said communication apparatus, the second transmission processing being different from the first transmission processing;
a limiting unit configured to, in a case where a distance between the communication apparatus and the external apparatus is within a range in which the second transmission processing by the second transmission unit can be performed and an execution condition of the second transmission processing satisfies a predetermined condition limit a notification for reception of an incoming call by the first transmission unit and not to, in a case where the distance between the communication apparatus and the external apparatus is within the range and an execution condition of the second transmission processing does not satisfy the predetermined condition, limit the notification for reception of the incoming call by the first transmission unit; and
a display unit configured to, in a case where a user did not respond to an incoming call during execution of limitation by said limiting unit, perform a display for notifying that there was the incoming call.

2. The communication apparatus according to claim 1, further comprising
a disconnection unit configured to disconnect a wireless connection by the second transmission unit with the external apparatus in accordance with an end of the second transmission processing executed by the second transmission unit; and
a cancellation unit configured to cancel a limiting state by the limiting unit in accordance with the disconnection of the wireless connection of the second transmission unit.

3. The communication apparatus according to claim 2, wherein, among incoming call/mail alert display, incoming call/mail alert sound, and incoming call/mail alert vibration, the limiting unit turns OFF any notification function that is in an ON status.

4. The communication apparatus according to claim 3, wherein the cancellation unit turns ON a notification function that was turned OFF by the limiting unit.

5. The communication apparatus according to claim 1, wherein a history of an incoming call/mail received by the first transmission unit during the second transmission processing by the second transmission unit is displayed after an end of the second transmission processing by the second transmission unit.

6. The communication apparatus according to claim 1, further comprising an incoming call blocking unit configured to, if an incoming call/mail received by the first transmission unit during the second transmission processing by the second transmission unit is a voice communication, block the incoming call.

7. The communication apparatus according to claim 1, further comprising a unit configured to, if an incoming call/mail received by the first transmission unit during the second transmission processing by the second transmission unit is a voice communication, perform telephone answering with respect to the incoming call.

8. The communication apparatus according to claim 1, further comprising:
a mail reception unit configured to, if an incoming call/mail received by the first transmission unit during the second transmission processing by the second transmission unit is a mail to be received, receive the mail; and
a notification unit configured to notify that the mail reception unit has received a mail after an end of the second transmission processing by the second transmission unit.

9. The communication apparatus according to claim 1, further comprising:
an obtaining unit configured to obtain a remaining data amount or remaining transmission time of the second transmission processing by the second transmission unit;
a selection unit configured to select, base on the remaining data amount or remaining transmission time obtained by the obtaining unit, either (i) blocking the incoming voice communication or (ii) holding the incoming voice communication and canceling the holding after an end of the second transmission processing by the second transmission unit; and
an incoming call control unit configured to (i) block the incoming voice communication or (ii) hold the incoming voice communication and cancel the holding after an end of the second transmission processing by the second transmission unit, in accordance with the selection by the selection unit.

10. The communication apparatus according to claim 1, wherein a transmission range of the second transmission unit is shorter than a communication range of the first transmission unit.

11. The communication apparatus according to claim 1, further comprising a vibrating unit configured to notify an incoming call/mail received by the first transmission unit by vibration,
wherein the limiting unit limits the vibration by the vibrating unit.

12. The communication apparatus according to claim 11, wherein the limiting unit prohibits the vibrating unit from execution of the vibration.

13. The communication apparatus according to claim 1, further comprising an audio output unit configured to notify an incoming call/mail received by the first transmission unit by an audio output,
wherein the limiting unit limits audio output by the audio output unit.

14. The communication apparatus according to claim 13, wherein the limiting unit prohibits the audio output unit from outputting the audio output.

15. The communication apparatus according to claim 1, further comprising a display unit configured to notify an incoming call/mail received by the first transmission unit by an display output,
wherein the limiting unit limits a display by the display unit.

16. The communication apparatus according to claim 15, wherein the limiting unit prohibits the display unit from displaying the incoming.

17. The communication apparatus according to claim 1, wherein the transmission by the second transmission processing is performed by using Near Field Communication.

18. The communication apparatus according to claim 1, wherein predetermined data is transmitted by the second transmission processing.

19. The communication apparatus according to claim 1, wherein the second transmission unit performs the second transmission processing using an electromagnetic induction.

20. The communication apparatus according to claim 1, wherein the limiting unit executes the limitation in accordance with start of the second transmission processing.

21. The communication apparatus according to claim 1, wherein the limiting unit is configured to, in a case where a distance between the communication apparatus and the external apparatus is within a range in which the second transmission processing by the second transmission unit can be performed and the second transmission processing is not completed, limit the notification for reception of an incoming call by the first transmission unit, and not to, in a case where the distance between the communication apparatus and the external apparatus is within the range and the second transmission processing is completed, limit the notification for reception of the incoming call by the first transmission unit.

22. A method for controlling a communication apparatus that includes at least a first transmission unit configured to perform a first transmission processing for wirelessly transmitting at least a call and a second transmission unit configured to perform a second transmission processing for executing a wireless transmission from an external apparatus to said communication apparatus, the second transmission processing being different from the first transmission processing, said method comprising:
limiting a notification for reception of an incoming call by the first transmission unit in a case where a distance between the communication apparatus and the external apparatus is within a range in which the second transmission processing by the second transmission unit can be performed and an execution condition of the second transmission processing satisfies a predetermined condition, and not limiting the notification for reception of the incoming call by the first transmission unit, in a case where the distance between the communication apparatus and the external apparatus is within the range and an execution condition of the second transmission processing does not satisfy the predetermined condition; and
performing, in a case where a user did not respond to an incoming call during execution of limitation in the limiting a notification, a display for notifying that there was the incoming call.

23. A non-transitory computer-readable recording medium storing a program that causes a computer to perform a method for controlling a communication apparatus that includes at least a first transmission unit configured to perform a first transmission processing for wirelessly transmitting at least a call and a second transmission unit configured to perform a second transmission processing for executing a wireless transmission from an external apparatus to said communication apparatus, the second transmission processing being different from the first transmission processing, said method comprising:

limiting a notification for reception of an incoming call by the first transmission unit in a case where a distance between the communication apparatus and the external apparatus is within a range in which the second transmission processing by the second transmission unit can be performed and an execution condition of the second transmission processing satisfies a predetermined condition, and not limiting the notification for reception of the incoming call by the first transmission unit, in a case where the distance between the communication apparatus and the external apparatus is within the range and an execution condition of the second transmission processing does not satisfy the predetermined condition; and performing, in a case where a user did not respond to an incoming call during execution of limitation in the limiting a notification, a display for notifying that there was the incoming call.

* * * * *